United States Patent
Tsai

(10) Patent No.: US 8,184,028 B2
(45) Date of Patent: May 22, 2012

(54) VIDEO DATA SOURCE SYSTEM

(75) Inventor: Jui-Yuan Tsai, Tai Nan (TW)

(73) Assignee: Realtek Semiconductor Corp., Hsinchu (TW)

( * ) Notice: Subject to any disclaimer, the term of this patent is extended or adjusted under 35 U.S.C. 154(b) by 1288 days.

(21) Appl. No.: 11/898,347

(22) Filed: Sep. 11, 2007

(65) Prior Publication Data

US 2008/0063049 A1    Mar. 13, 2008

(30) Foreign Application Priority Data

Sep. 13, 2006  (TW) ............................... 95133776 A

(51) Int. Cl.
*H03M 1/66* (2006.01)
(52) U.S. Cl. ......... 341/144; 341/145; 348/180; 348/192
(58) Field of Classification Search .............. 341/144
See application file for complete search history.

(56) References Cited

U.S. PATENT DOCUMENTS

| | | | |
|---|---|---|---|
| 5,333,010 A | 7/1994 | Nakamura et al. | |
| 5,596,373 A | 1/1997 | White et al. | |
| 5,621,428 A | 4/1997 | King et al. | |
| 6,411,330 B1 * | 6/2002 | Purcell et al. | 348/180 |
| 6,452,526 B2 | 9/2002 | Sagawa et al. | |
| 6,545,707 B1 * | 4/2003 | Newcomb et al. | 348/192 |
| 6,778,119 B2 * | 8/2004 | May | 341/144 |
| 6,989,779 B2 * | 1/2006 | Sasaki et al. | 341/144 |
| 6,999,015 B2 * | 2/2006 | Zhang et al. | 341/144 |
| 7,450,095 B2 * | 11/2008 | Yu et al. | 345/82 |
| 7,468,687 B2 * | 12/2008 | Nozawa et al. | 341/144 |

* cited by examiner

*Primary Examiner* — Khai M Nguyen
(74) *Attorney, Agent, or Firm* — Muncy, Geissler, Olds & Lowe, PLLC

(57) ABSTRACT

A video data source system includes a video encoder and an analog back end device. The analog back end device includes a digital to analog converter and a post-stage driving unit. The video data source system adds the post-stage driving unit into the analog back end device and strengthens its driving ability by the post-stage driving unit.

14 Claims, 4 Drawing Sheets

VIDEO DATA SOURCE SYSTEM

BACKGROUND OF THE INVENTION (a) Field of the Invention

The invention relates to video data source systems, particularly to analog back ends in video data source systems.

(b) Description of the Related Art

Since the entering of the 20th century, the development of television technology and its applications has proven that it is now part of human life and core of entertainment. Because of the improvement of display technology in recent years, providing massive data and high-definition images has become the focus of the future development of the television industry. Please refer to FIG. 1, showing a schematic diagram of a typical television system and its video source. As shown in FIG. 1, the video source system 110 transmits video data in analog signal format to a television system 120 for reproducing video images. Although digitized transmission interfaces have already become available, analog transmission interfaces are still most commonly used.

The video source of the television system 120 can take many forms, such as a DVD player, set top box, and even various game consoles. In general, the components of the video source system 110 comprise a video encoder 112 for performing image data encoding, and a digital-to-analog converter (DAC) 114, which converts the encoded digital signal into an image analog signal and outputs the image analog signal.

The television system 120, such as a LCD TV or other flat panel television system or digital television system, which is becoming the main stream applications, receives an image analog signal transmitted from the video source, converts it into digital format with an analog-to-digital converter (ADC) 124, and performs decoding operation with a video decoder 122 for further image processing and displaying.

There are many types of video encoding format. The most commonly available ones are: RGB signal format, CVBS signal format, luminance/chrominance (Y/C) signal format, and color difference (YPrPb) signal format and so forth. Therefore, the analog transmission interface for transmitting video signals between the video source system 110 and the television system 120 can also be one of several types, such as Digital Visual Interface (DVI), which comprises a Display Data Channel (DDC), for transmitting signals in RGB format; AV interface for transmitting signals in the CVBS format; S-video interface for transmitting signals in the Y/C format; and color difference video interface for transmitting signals in the YPrPb format.

As shown in FIG. 2, in the case of the video analog signal Aout of Y channel while the video encoding format is YC signal format, the video analog signal Aout comprises a Y signal and a synchronizing signal (Sync signal). The dynamic range of the common Y signal is 0.7V while that of the Sync signal is 0.3V. Thus, it requires a total dynamic range of 1V.

As shown in FIG. 1, in a commonly seen application, each of the power source resistor RS of the output terminal of the video source system 110 and the load resistor RL of the input terminal of the television system 120 has a resistance of about 75Ω. It is therefore required that the output of the digital-to-analog converter 114 has the capability to drive a resistance of 37.5Ω, which is the resulting resistance of the two parallelly-connected resistors RS and RL, and meanwhile has the dynamic range of 1V. It can be seen in the figure that the digital-to-analog converter 114 has to directly drive the load of 37.5Ω, and in order to drive such a relatively small load, the digital-to-analog converter 114 needs to output a relatively large current, which in turn results in excessive power consumption of the digital-to-analog converter 114.

In the conventional design, a buffer amplifier outside the chip, usually disposed on the printed circuit board, is used to provide the required driving power. However, such design still suffers the problems of increasing costs of external circuitry and increasing power consumption due to the added buffer amplifier.

BRIEF SUMMARY OF THE INVENTION

In light of the above-mentioned problem, one object of the invention is to provide a video data source system, which adds a post-stage driving unit into the analog back end device.

In order to achieve the above-mentioned object, the invention provides a video data source system, receiving a digital signal that represents video data and generating an adjusted analog signal. The video data source system comprises a video encoding unit and an analog back end device. The video encoding unit receives the digital signal, encodes the digital signal, and generates an encoded digital signal. The analog back end device comprises a digital-to-analog converter and a post-stage driving unit. The digital-to-analog converter receives the encoded digital signal and converts the received encoded digital signal into a video analog signal. The post-stage driving unit receives the video analog signal and then generates an adjusted analog signal to drive a post-stage component.

In one embodiment of the invention, the video source system utilizes the additional post-stage driving unit to control the biasing point of its output signal. As a result, the driving power of the video source system to the post-stage component can be improved and the problems in the prior art can be solved.

DETAILED DESCRIPTION OF THE INVENTION

Figure 1:
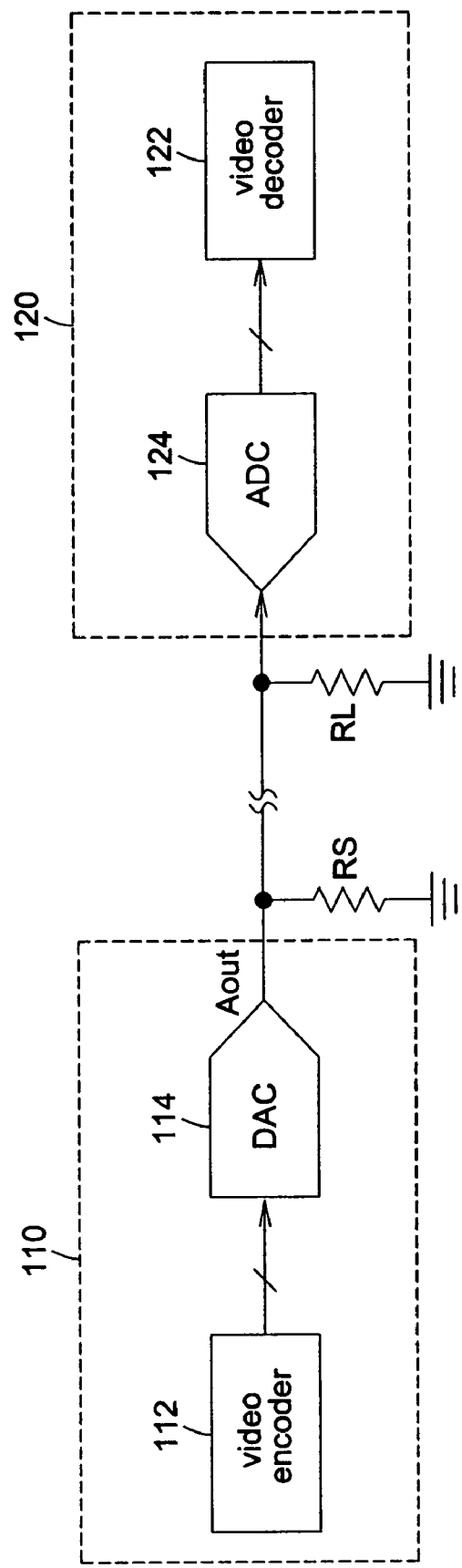
FIG. 1 shows a schematic diagram illustrating a television system and a video source thereof.
Figure 2:
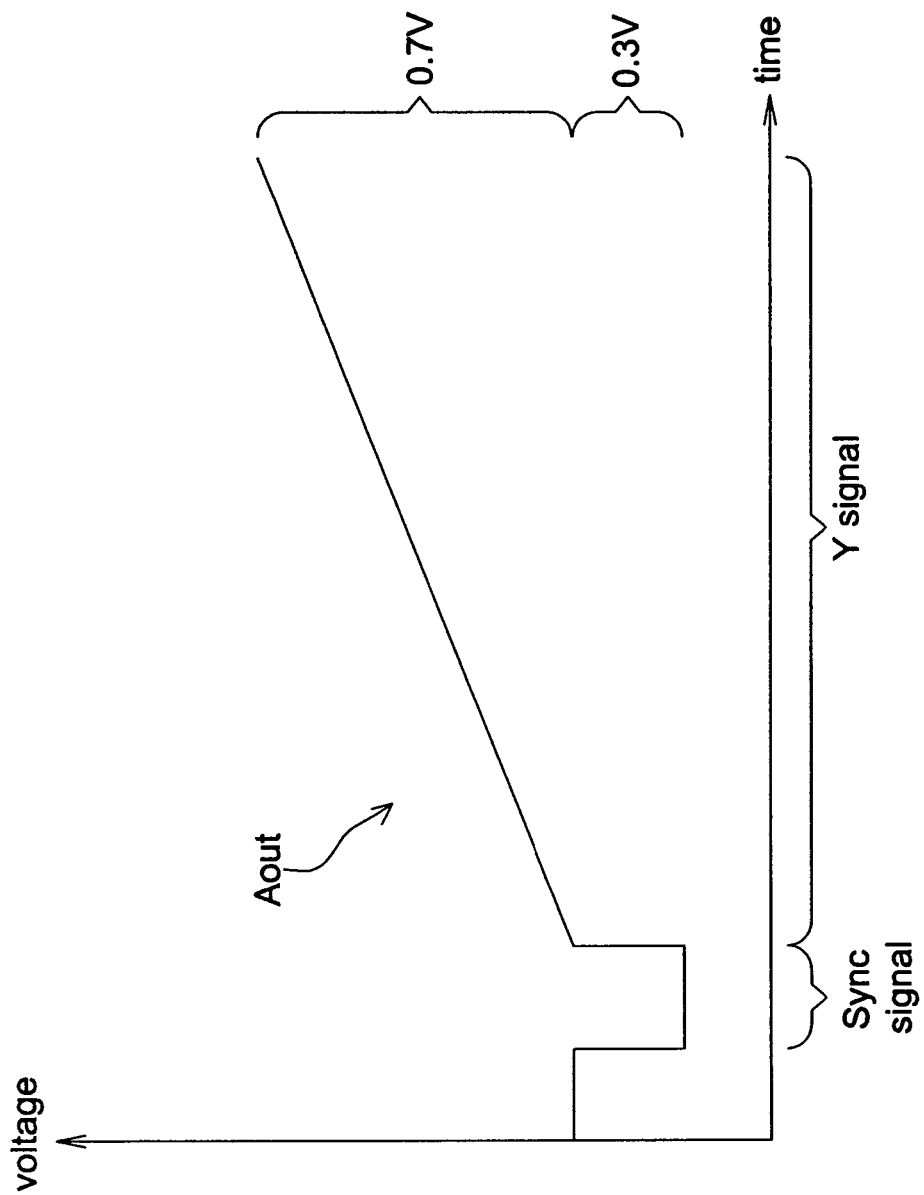
FIG. 2 shows a video analog signal waveform diagram.
Figure 3:
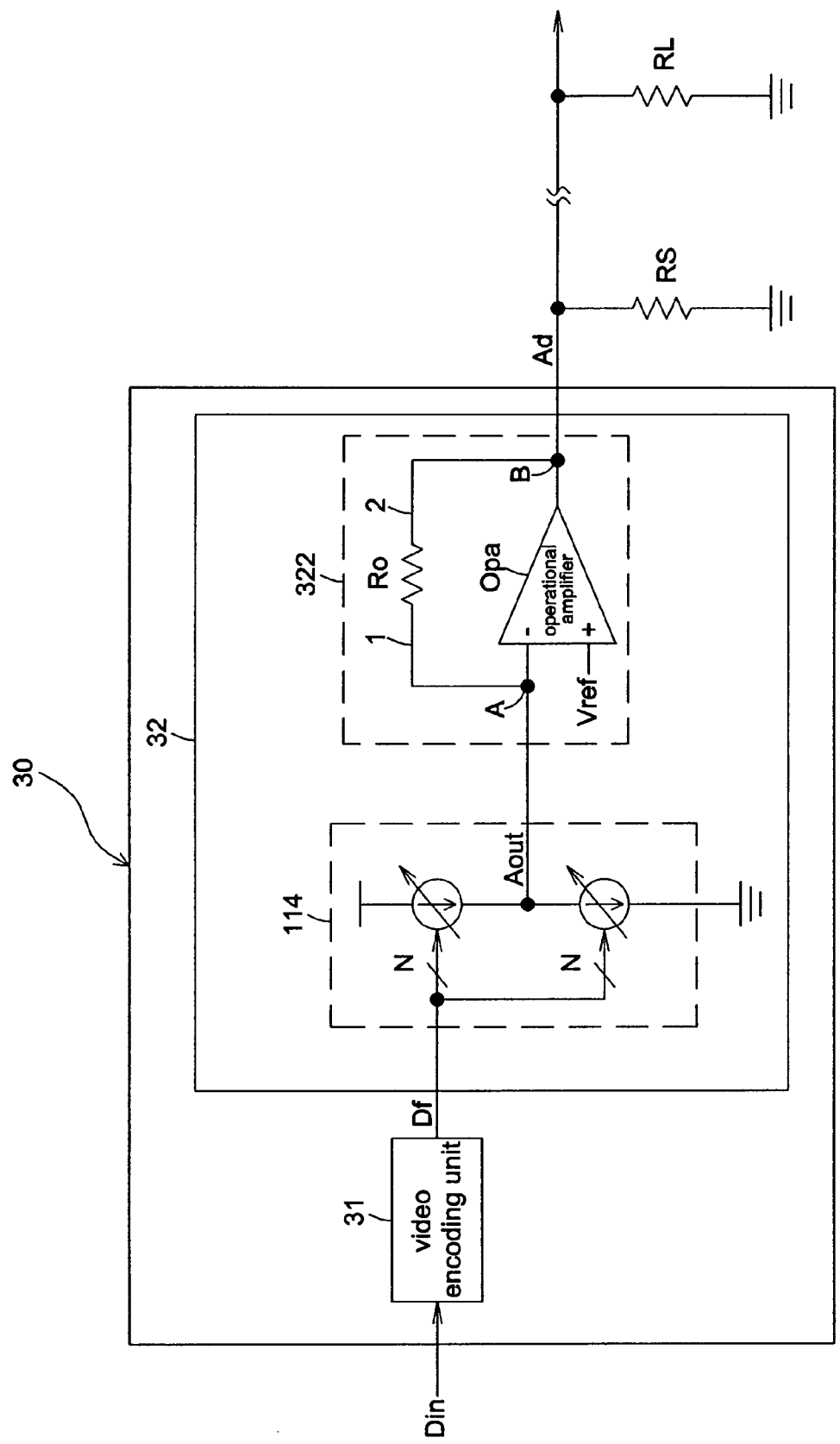
FIG. 3 shows a schematic diagram illustrating a video data source system and its subsequent circuit according to one embodiment of the invention.

FIG. 3 shows a schematic diagram illustrating the video data source system 30 and its subsequent circuit according to one embodiment of the invention. The video data source system 30 generates an adjusted analog signal Ad according to a digital signal Din. The video data source system 30 comprises a video encoding unit 31 and an analog back end device 32. In this embodiment of the invention, the format of the adjusted analog signal Ad comprises the image data components, such as the RGB signal, the CVBS signal, the YC signal, or the YPrPb signal. However, the applications of the invention are not limited by these examples. Any existing or future to be developed video format can also apply the concept of the invention. A DVD player, a set top box, and even various game consoles can be examples of the video data source system according to the invention. However, the invention is not limited to these examples and any existing or future to be developed video data source system can also apply the concept of the invention.

The video encoding unit 31 receives the digital signal Din and encodes the digital signal Din into a video encoding format to generate an encoded digital signal Df. The digital signal Din may represent a television signal from the station or an image signal read from an optical disk, etc.

The analog back end device 32 comprises a digital-to-analog converter 114 and a post-stage driving unit 322. The digital-to-analog converter 114 receives the encoded digital signal Df and converts the received encoded digital signal Df into a video analog signal Aout. The post-stage driving unit 322 receives the video analog signal Aout, adjusts the absolute voltage level of the video analog signal Aout, and then generates an adjusted analog signal Ad. The post-stage driving unit 322 comprises a resistor Ro and an operational amplifier Opa. The resistor Ro in the post-stage driving unit 322 comprises a first end 1 and a second end 2. The inverting input terminal of the operational amplifier Opa is coupled to the first end 1 of the resistor Ro to form an input node A for receiving the video analog signal Aout. On the other hand, the non-inverting input terminal of the operational amplifier Opa receives a reference voltage Vref, and the output terminal of the operational amplifier Opa is coupled to the second end 2 of the resistor Ro to form an output node B. The operational amplifier Opa generates the adjusted analog signal Ad at the output node B. Finally, the video data source system 30 outputs the adjusted analog signal Ad to drive the subsequent circuit comprised of a power source resistor RS and a load resistor RL. Generally, the subsequent circuit is constituted of the post-stage load, comprised of the components on the circuit board and transmission medium, such as cables.

It should be noted that the digital-to-analog converter 114 is implemented by a well-known current-steering digital-to-analog converter (current-steering DAC), wherein a plurality of digital bits control switching on or off of a plurality of current sources. For example as shown in FIG. 3, N digital bits are used to control switching on or off of two current sources. Since the purpose and method of outputting the total current of the plurality of current sources to achieve the digital to analog conversion is well known to those who are skilled in the art, the details will not be given herein. In a preferred example, the post-stage driving unit 322, including the operational amplifier Opa and the resistor Ro, together with the digital-to-analog converter 114 and/or the video encoding unit 31 are realized by semiconductor manufacturing processes and formed in a single integrated circuit, or, in the same die. Therefore, the costs due to adoption of external circuitry can be prevented. However, the invention is not limited thereto.

In the embodiment shown in FIG. 3, in order to reduce the power consumption of the digital-to-analog converter 114, the resistance of the resistor Ro as the load is designed to be a relatively large value, such as 300Ω, significantly larger than 75Ω or 37.5Ω. Thus, the output current value of the digital-to-analog converter 114 can be controlled at a relatively small value to effectively lower the power consumption of the digital-to-analog converter 114. In order to make the operational amplifier Opa have the optimal driving power, the biasing point needs to be adequately controlled. This can be accomplished by the negative feedback configuration of the operational amplifier Opa and the resistor Ro, and the proper adjustment of the value of the reference voltage Vref. For example, when the suitable biasing point of the operational amplifier Opa is within 1~2V, the Vref can be designed at, for example, 1.5V. Thus, when the upper and lower parts of the digital-to-analog converter 114 respectively supply and drain current via the path formed with the resistor Ro, the operational amplifier Opa can operate in a desired range.

Figure 4:
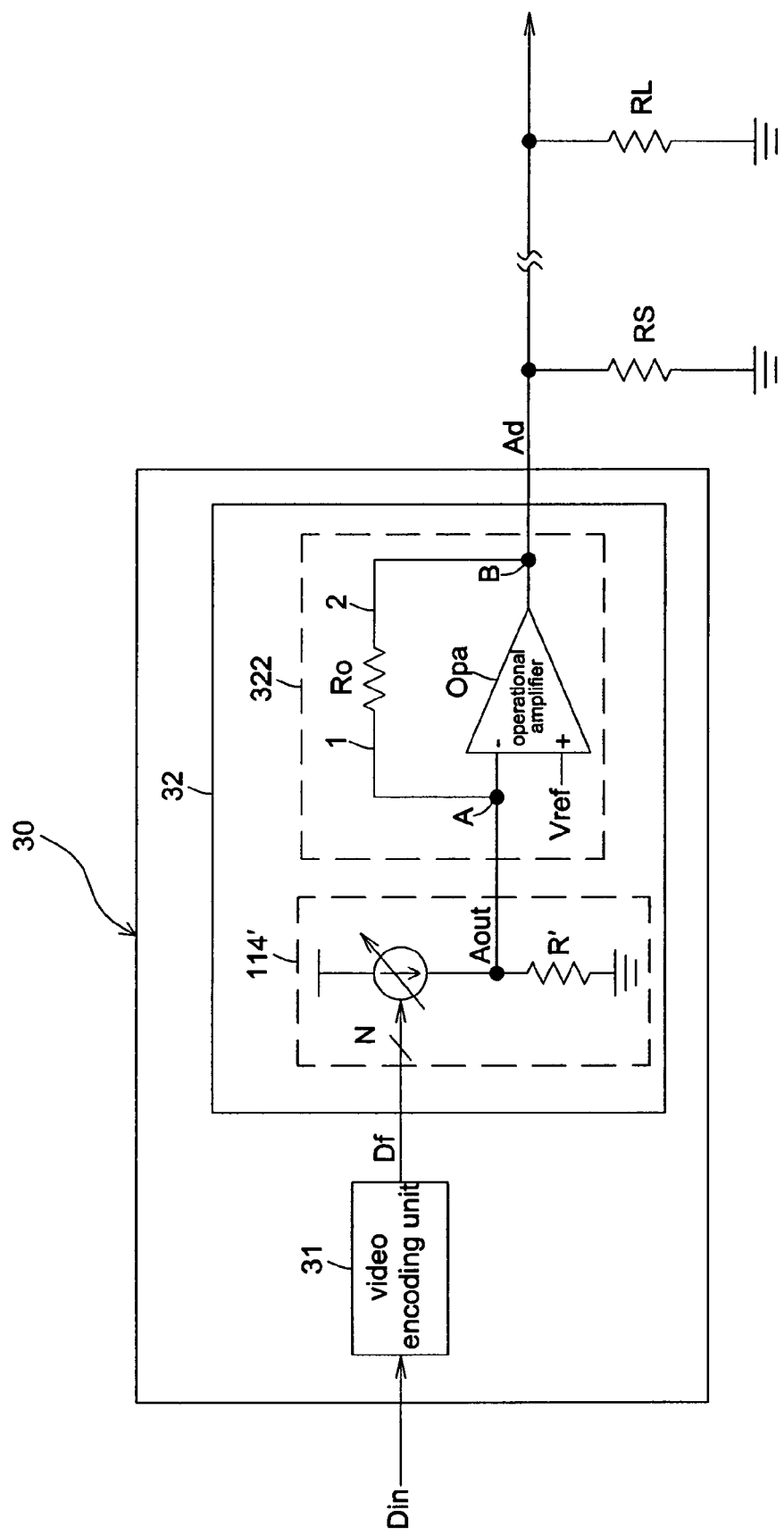
FIG. 4 shows a schematic diagram illustrating a video data source system and its subsequent circuit according to another embodiment of the invention.

For those who are skilled in the art, it is understood that the upper and lower parts of the digital-to-analog converter 114 shown in FIG. 3 are the current sources, the switching on/off of which is controlled by the encoded digital signal Df outputted by the video encoding unit 31. However, the invention is not limited to this example. In another example, one of the upper and lower parts can be implemented by a constant current source; or, one of the upper and lower parts can be implemented by a resistor. As shown in FIG. 4, the lower part of the digital-to-analog converter 114 is implemented by a resistor R'. It should be noted that the resistance of the resistor R' is also designed to be a relatively large value to prevent the digital-to-analog converter 114 from consuming too much power.

Although the present invention has been fully described by way of examples with reference to the accompanying drawings, it should not be construed as any limitation on the scope of the present invention. Various modifications and changes can be made by those who are skilled in the art without deviating from the essence of the invention.

What is claimed is:

1. A video data source system connected to a transmission interface having an equivalent impedance, comprising:
    a video encoding unit for receiving a digital signal that represents video data, encoding the digital signal, and generating an encoded digital signal;
    a digital-to-analog converter for receiving the encoded digital signal and converting the received encoded digital signal into a video analog signal; and
    a post-stage driving unit for reducing an output current from the digital-to-analog converter, the post-stage driving unit receiving the video analog signal and generating an adjusted analog signal to drive a post-stage component;
    wherein the post-stage driving unit comprises:
        a resistor having a resistance greater than the equivalent impedance; and
        an operational amplifier, wherein a first input terminal of the operational amplifier is connected to one end of the resistor to form an input node for receiving the video analog signal, a second input terminal of the operational amplifier receives a reference voltage, and an output terminal of the operational amplifier is coupled to the transmission interface and the other end of the resistor to form an output node for generating the adjusted analog signal.

2. The video data source system according to claim 1, wherein the first input terminal is an inverting input terminal and the second input terminal is a non-inverting input terminal.

3. The video data source system according to claim 1, wherein the post-stage driving unit is provided in the same integrated circuit as the digital-to-analog converter.

4. The video data source system according to claim 1, wherein the digital-to-analog converter is implemented by an N-bit (N is a positive integer) adjustable current source.

5. The video data source system according to claim 1, wherein the digital-to-analog converter is implemented by two N-bit (N is a positive integer) adjustable current sources.

6. The video data source system according to claim 1, wherein the adjusted analog signal is compliant with a video encoding format, and wherein the video encoding format is one of a CVBS signal format, a brightness signal (Y, C) signal format, and a color difference (Y, Pr, Pb) signal format.

7. The video data source system according to claim 1, wherein the equivalent impedance is 37.5Ω.

8. An analog back end device connected to a transmission interface having an equivalent impedance, comprising:
  a digital-to-analog converter for receiving an encoded digital signal that represents video data and converting the received encoded digital signal into a video analog signal; and
  a post-stage driving unit for reducing an output current from the digital-to-analog converter, the post-stage driving unit receiving the video analog signal and generating an adjusted analog signal to drive a post-stage component;
  wherein the post-stage driving unit comprises:
    a resistor having a resistance greater than the equivalent impedance; and
    an operational amplifier, wherein a first input terminal of the operational amplifier is connected to one end of the resistor to form an input node for receiving the video analog signal, a second input terminal of the operational amplifier receives a reference voltage, and an output terminal of the operational amplifier is coupled to the other end of the resistor to form an output node for generating the adjusted analog signal.

9. The analog back end device according to claim 8, wherein the first input terminal is an inverting input terminal and the second input terminal is a non-inverting input terminal.

10. The analog back end device according to claim 8, wherein the post-stage driving unit is provided in the same integrated circuit as the digital-to-analog converter.

11. The analog back end device according to claim 8, wherein the digital-to-analog converter is implemented by an N-bit (N is a positive integer) adjustable current source.

12. The analog back end device according to claim 8, wherein the digital-to-analog converter is implemented by two N-bit (N is a positive integer) adjustable current sources.

13. The analog back end device according to claim 8, wherein the adjusted analog signal is compliant with a video encoding format, and wherein the video encoding format is one of a CVBS signal format, a brightness signal (Y, C) signal format, and a color difference (Y, Pr, Pb) signal format.

14. The analog back end device according to claim 8, wherein the equivalent impedance is 37.5Ω.

* * * * *